Feb. 12, 1963

E. C. HORTON ETAL

FRICTION DRIVE MEANS PARTICULARLY ADAPTED FOR RADIO TUNERS 3,077,119

Filed July 24, 1961

4 Sheets-Sheet 1

INVENTORS
EDWARD C. HORTON &
JOHN H. TEAF
BY
Brasser, Smith & Hardy
ATTORNEYS

INVENTORS
EDWARD C. HORTON &
JOHN H. TEAF
BY
Buesser, Smith & Harding
ATTORNEYS

Feb. 12, 1963 E. C. HORTON ET AL 3,077,119
FRICTION DRIVE MEANS PARTICULARLY
ADAPTED FOR RADIO TUNERS
Filed July 24, 1961 4 Sheets-Sheet 3

INVENTORS
EDWARD C. HORTON &
JOHN H. TEAF
BY
ATTORNEYS

INVENTORS
EDWARD C. HORTON &
JOHN H. TEAF
BY
ATTORNEYS

United States Patent Office 3,077,119
Patented Feb. 12, 1963

3,077,119
FRICTION DRIVE MEANS PARTICULARLY ADAPTED FOR RADIO TUNERS

Edward C. Horton, Haddonfield, and John H. Teaf, Merchantville, N.J., assignors, by mesne assignments, to Thompson Ramo Wooldridge Inc., Euclid, Ohio, a corporation of Ohio Filed July 24, 1961, Ser. No. 126,194
7 Claims. (Cl. 74—206)

The invention relates to friction drive means adapted for use in tuners for push button radios of the automotive type, such means being, however, generally applicable to other uses.

The invention represents a solution to certain problems existing particularly in the art of radio tuners, of the type shown for example in the Teaf U.S. Patent No. 2,898,767, dated August 11, 1959, and will be considered in connection therewith for the purpose of illustration. In such a tuner, tuning is effected by the variable positioning of magnetic cores within coils which are inductances in the receiver tuning circuit. These cores are positioned through means including a treadle bar arrangement, which may be adjusted manually by means of either preset individual push-button slide assemblies or by a knob for random tuning. In the latter case, as shown in said patent, the tuning knob is operably connected to the treadle bar by drive means including friction clutch devices and gearing. The driving means are characterized by certain design limitations, as discussed hereafter, and this application is concerned primarily with improvements in drive means of the same general type.

Using the tuner disclosed in said patent as an example, motion of the shaft which is manually rotated, with the aid of a knob, is transmitted to a shaft parallel thereto by means of pinched disc type motion transmitting elements, which second shaft is in turn geared to the treadle bar. Interposed in this gear train is a further clutch, with the twofold purpose of disconnecting the knob-operated mechanism from the tuning means during push-button operation and for permitting additional slippage in the driving mechanism when the treadle bar has been manually driven to its limit of rotation in either direction.

The pinched disc type of driving means is well-known but heretofore it has been used only for transmitting motion between parallel shafts. In such an arrangement a pair of tightly engaging flat discs are fixed on one shaft and on a parallel second shaft a similar single disc fixed thereon has its periphery pinched between the two first-mentioned discs, whereby motion is transmitted.

In the design of compact and intricate mechanisms such as tuners it is frequently desired to transmit motion between shafts which are considerably non-parallel. Problems of this kind may arise, for example, because a certain positioning of the radio push-button panel on the automobile instrument panel is desired for decorative reasons. In the case of non-parallel shafts, i.e., shafts which have intersecting axes, or which have axes which cross each other without intersecting, however, the conventional pinched disc type of drive means cannot be satisfactorily used, with the result that less simple means such as gearing must be used. Pinched discs are nevertheless desirable in such situations, not only because of their relative simplicity but also because of their ability to slip and to tolerate certain necessary angular changes in relationship of the shafts.

Accordingly, it is the main object of the invention to provide means of the pinched disc type to transmit driving motions between shafts having axes intersecting at slight or considerable angles or in a skew relationship to each other.

It is a further object to provide such means having characteristics particularly adapted to use in radio tuners of the push-button automotive type.

It is a further object to provide pinched disc type motion transmitting means which permits occurrence of considerable changes in shaft relationships without affecting its operation.

Briefly, in accordance with the invention driving motion is transmitted between shafts being in approximately the same plane, but at an angle to each other, by means of interengaging discs. As in conventional drive means of this type a disc on one shaft is resiliently pinched between a pair of tightly engaging discs on the other shaft. Because the peripheral edges of these discs could not interengage in the same plane, each disc on one or each of the shafts has its circular peripheral edge portion turned away from the central plane thereof, i.e., of conical or approximately conical form. Thus, as will be seen hereafter, the intermeshing portions of the disc tightly engage each other in such a manner as to be capable of effectively transmitting a considerable torque.

In an ideal situation the shafts would be non-parallel but their axes would lie in a common plane, but for reasons explained hereafter it may be necessary to tolerate movement of one shaft (particularly the driven shaft) so that the axes of the shafts do not lie and intersect in a common plane. According to the invention such changes in shaft relationships are permitted without adversely affecting the operation of the discs.

Further objects and advantages will become apparent from the following description, read in conjunction with the accompanying drawings in which.

Figure 9:
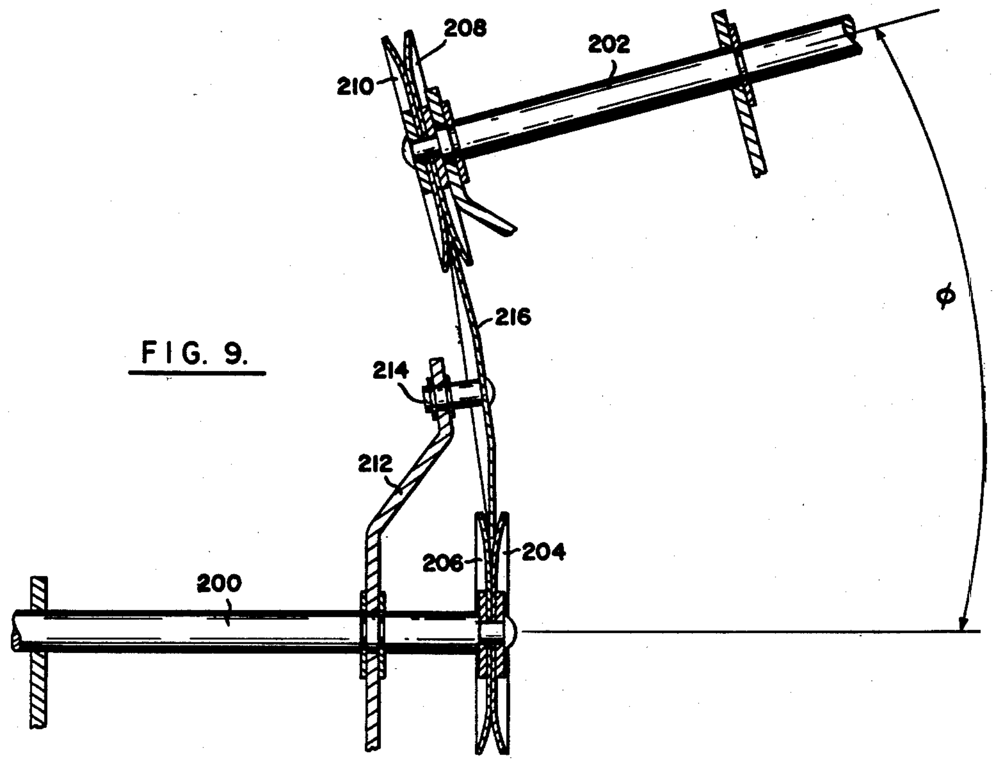
Figures 6, 7, 8:
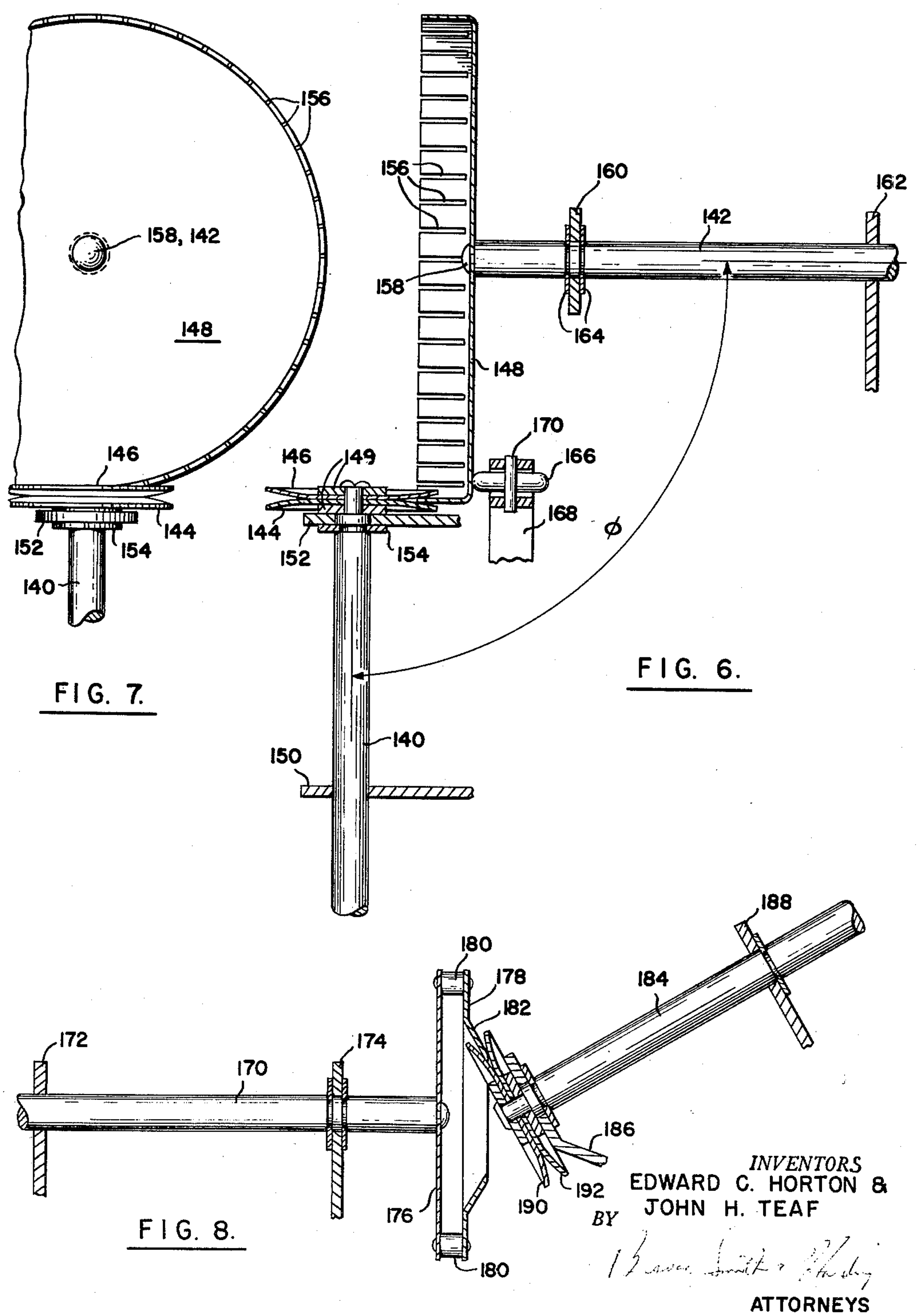
FIGURE 6 illustrates a further modified form of the invention wherein the shafts are disposed at right angles.
FIGURE 7 is an end view of the structure shown in FIGURE 6.

FIGURE 8 illustrates a further modified form of the invention, wherein an annular element on one shaft has its inner rather than outer periphery turned angularly and in engagement with a pair of pinched discs on a second shaft; and FIGURE 9 is a further modification of the invention wherein motion is transmitted between two widely spaced shafts, disposed at a slight angle to each other, through an intermediate idler disc.

Figure 1:
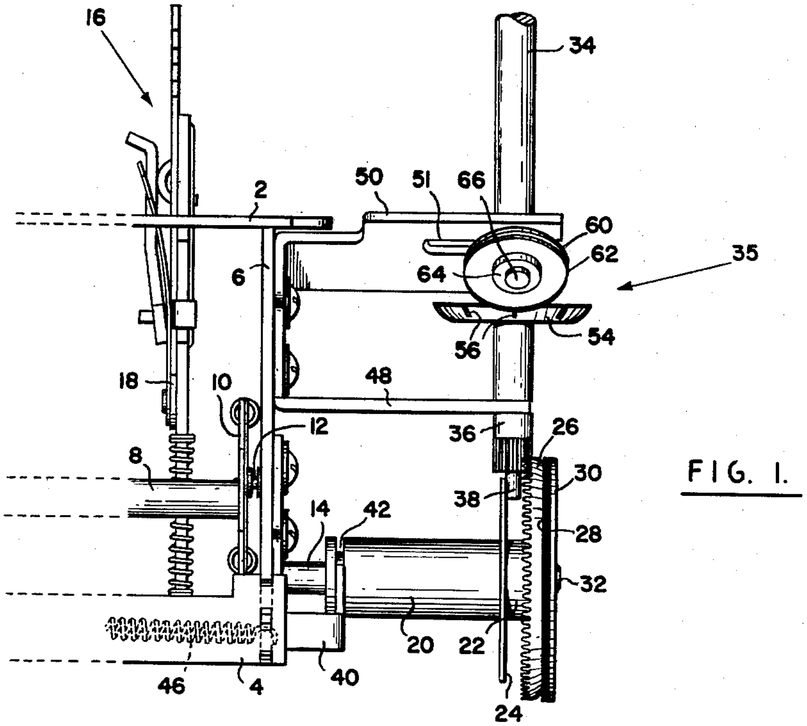
FIGURE 1 is a view of the bottom of one end of a complete tuner assembly, particularly illustrating the pinched disc drive means according to the invention.
Figure 3:
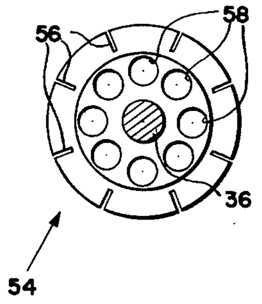
FIGURE 3 is a view of the back face of the single driven disc in the assembly shown in FIGURE 2, and taken as indicated by the lines 3—3 in FIGURE 2.
Figures 2, 2A:
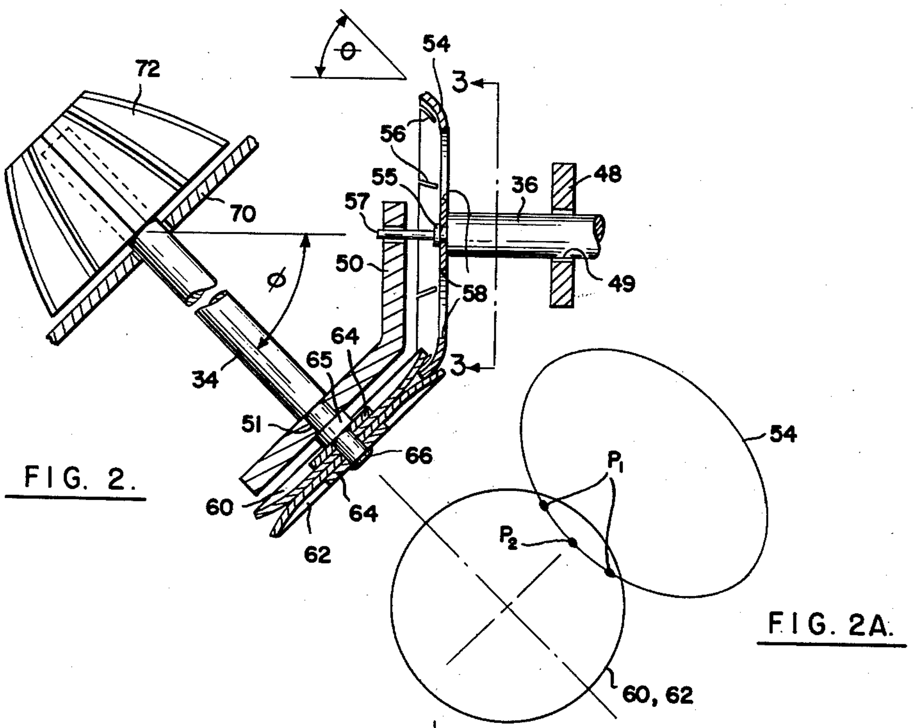
FIGURE 2 is a view from the right end of the tuner assembly shown in FIGURE 1, when in the upright position.
FIGURE 2A is a diagram illustrating the points of contact between the disc, projected along the axis of the driving shaft as indicated by the relationship between FIGURES 2 and 2A.

Referring to FIGURES 1 to 3, there will first be described one form of drive means as applied to the tuner of a push-button type radio, it being understood that the other forms successively described hereafter are similarly applicable to such tuners. FIGURE 1 is a bottom view of that end of the tuner which would be on the right hand side as the tuner is viewed from its front. The structural metal framework of the tuner includes a front panel 2, a rear cross member 4 and an end panel 6. One of two treadle bars, previously mentioned, is visible and indicated at 8, and at one end the treadle bars are secured in an element 10 which is rotatable about a pivot 12 in the frame. Element 10 is provided with gear segments (not shown) whereby it may be manually rotated about pivot 12 by a pinion (also not shown) mounted on a shaft 14. Element 10 also may be rotated by manual operation of a plurality of push-button slide assemblies, one of which as indicated at 16, each having a cam 18 which acts on the treadle bars. The effect of rotation of element 10, either by a slide assembly 16 or by shaft 14, is to operate a slide, not shown, which varies the positioning of magnetic cores within coils to provide variable inductances in the tuning circuit of the tuner as previously mentioned. For a specific description of the construction of such a push-button slide assembly 16, reference may be made to said Teaf Patent 2,898,767, wherein the further overall operation of the tuner is described.

Freely mounted for rotation on shaft 14 is a unitary assembly comprising a pair of collars 20 and 22 and a crown gear 26, a spring metal disc 24 being interposed between the collars. Secured on the end of shaft 14 is a plate 30, a disc 28 of rubber or other friction composition being interposed between plate 30 and the crown gear 26. Crown gear 26 is adapted to be rotated by a pair of shafts 34 and 36, operatively connected by the novel means 35 described hereafter, the shaft 36 having at its free end a pinion which meshes with the gear 26. Shaft 34 is provided for manual random tuning, facilitated by a knob 72 thereon as shown in FIGURE 2. Intermeshing of the pinion and gear 26 is maintained by the pressure of disc 24 against the reduced end 38 of shaft 36. Rotation of gear 26 is transmitted to shaft 14 through the rubber disc 28 and plate 30, this arrangement constituting a friction clutch. This clutch may be disengaged, however, by means of a slide 40 which has its end seated in a groove 42 in collar 20 and is normally urged outwardly by a spring 46. Movement of collar 20 to the left, by means of slide 40 whenever a push-button is actuated, serves to disengage crown gear 26 from the disc 28, whereby rotation of shafts 36 and 34 is prevented when the treadle bars are rotated by the push-button operation. The movement of shaft 36 to the left, which is necessary to permit such disengagement, is made possible by the fact that shaft 36 is mounted in an elongated supporting slot 49 in a frame member 48 as shown in FIGURE 2. Shaft 34 is mounted for rotation in a slot 51 in an arm 50 of the main frame. As disclosed in the aforesaid patent, slide 40 is operated by any one of the push-button slide assemblies 16 upon movement thereof to an inner treadle bar engaging position, whereby each operation of a slide assembly to select a preset radio frequency is accompanied by a temporary disconnection of the manually driven shafts 34 and 36 from shaft 14, effected by the disengagement of clutch elements 26, 28 and 30. Such matters are secondary to the primary invention, though it should be noted that while the driving shaft 34 and driven shaft 36 normally are in alignment as viewed in FIGURE 1 the geared end of shaft 36 is thus movable to disturb such alignment.

The pinched disc drive means 35 constituting the main subject matter of the invention will now be described. As shown more particularly in FIGURE 2, a concave disc 54 is secured to shaft 36 by the upsetting, at 55, of a reduced end 57 thereof. This reduced end is freely mounted for rotation in the arm 50, previously mentioned. Disc 54 is concave in that as evident from FIGURE 2, toward the peripheral circular portion thereof it is turned away from its central plane. Two expedients are employed for the purpose of making disc 54 more flexible, for reasons discussed hereafter. First, it will be noted that radially directed slits 56 are cut in the periphery of disc 54 and, secondly, that as evident in FIGURE 3 particularly the central area of the disc has a plurality of circular openings 58 therein.

Mounted on shaft 34, between a pair of washers 64, are two discs 60 and 62. The assembly of washers 64 and discs 60 and 62 is bottomed against a shoulder 65 and is tightly clamped and held thereagainst by upsetting of the end of shaft 34 as indicated at 66. In their relaxed and normal condition discs 60 and 62 may be slightly more concave than shown in FIGURE 2, but when clamped on the edge of the shaft they flatly and tightly engage each other at their central portions.

To facilitate manual tuning through shaft 34 a suitably decorative knob 72 is provided at the end thereof. It will be noted that the axes of shafts 34 and 36 intersect at an angle $\phi$ in a vertical plane as shown in FIGURE 2, and as previously mentioned such a condition may be necessary or desirable for various reasons. For example in the presently illustrated case it may be desirable to have a sloping instrument panel portion 70, through which the shaft 34 passes, while nevertheless requiring a horizontal shaft 36. This is in contrast to the conventional arrangement wherein the shafts corresponding to present shafts 34 and 36 necessarily are parallel in a vertical plane. It should be understood that the dimensions of the mechanical parts described herein are greatly magnified as shown in the drawings. In a typical construction, the metal from which the discs are constructed may be of the order of only a few thousandths of an inch in thickness. The diameters of the discs in a typical case may range from one-half inch to one inch, though the application of the invention is by no means limited to this range of diameters, it being understood especially that much larger diameters may be used. The relative diameters of the discs on different shafts, of course, determine the driving ratio obtained. It has been found that the discs 54, 60 and 62, preferably are formed from a copper alloy which is relatively hard, such as beryllium copper, for good wear resisting properties and reasonable springiness. The remaining parts may be formed from stampings or the like of steel, brass, aluminum or copper.

When the parts are assembled as shown in FIGURE 2 the periphery of disc 54 is wedged between the discs 60 and 62 and in fact spreads them apart slightly at the locality of their engagement. This is possible due to the springy characteristic of discs 60 and 62, which are caused to tightly grip a circumferential portion of the interposed disc 54. Therefore, upon manual rotation of shaft 34 the motion thereof is transmitted from discs 60 and 62 to disc 54, thereby effecting rotation of shaft 36.

The nature of contact between the discs may be briefly mentioned. Neither point contact nor line contact is involved strictly. Rather, surface contacts over small localized areas are involved. With respect to the contact, or effective driving engagement, between disc 54 and disc 62, it is clear that these discs have opposite curvatures and therefore engage over a single localized area or point. In a diagrammatic projection, represented by FIGURE 2A, this localized area or point of contact, i.e. between discs 54 and 62, is indicated at $P_2$. Now, with respect to the contact relationship of discs 54 and 60, much depends on the relative dimensions, curvatures and other relationships of the discs. In general, however, the major contact between discs 54 and 60 will tend to be at the localized areas around the points indicated $P_1$ in FIGURE 2A. This tendency naturally will become more pronounced as the diameter of disc 54 is made relatively smaller with respect to the diameter of discs 60 and 62. As mentioned hereafter, the contact surface areas may be enlarged, with improved results, through the use of certain disc configurations.

The provision of slits 56 and openings 58 is an optional rather than necessary feature. In the case of a disc 54 having a diameter considerably greater or less than that or discs 60 and 62 the stresses in the discs may be severe. The action there involved tends to distort the periphery of the discs, particularly in the sense of imposing a straightening effect. The slits 56 render the disc 54, for example, more flexible and allow a certain degree of straightening, while thereby easing the stresses thereon. The openings 58 permit greater distortion of the periphery of disc 54 with respect to the central portion thereof. By reason of this expedient also, severe stresses in the disc 54 are lessened. As a further matter, greater changes in the relationship of the shafts 34 and 36 are permitted.

It will be understood that the transmission of driving motion between shafts 34 and 36, which are relatively disposed at an angle $\phi$, occurs because of the configuration of disc 54 wherein the periphery is turned away from the central portion by an angle $\theta$. The angle $\theta$, in the case illustrated, will correspond approximately to the angle $\phi$, although exact correspondence is unnecessary because of the ability of the discs to flex considerably at their peripheries . In addition to the obvious advantage of being able to transmit driving motion between shafts disposed at angles, it has been found that the illustrated pinched disc drive means is capable of transmitting a suprisingly high torque. In the application of the invention to a tuner such as shown in FIGURE 1 the shaft 36 must be free to shift within the slot 49 as the operation of slide 40 causes the engagement and disengagement of the clutch comprising crown gear 26, rubber disc 28 and plate 30. It will be noted, however, that the consequent disturbance in relationship of the shafts 34 and 36 does not produce disengagement of the pinched disc drive means but is tolerated due to the flexibility of the discs.

In the form of the invention described with reference to FIGURES 1 to 3 the driving ratio is near unity, the shafts rotate in opposite directions and the angle between the shafts is not great. There will now be described, with reference to FIGURE 4, a similar further form of the invention which, however, is better adapted to situations in which the driving and driven shafts are disposed at a more substantial angle to each other. Thus in FIGURE 4 there are shown two shafts, 80 and 82, either of which may be the driving shaft and the other the driven shaft. Shaft 80 is journalled in frame members 84 and 86, snap rings 88 being provided to restrict axial motion of shaft 80. Secured to the end of shaft 80, by means of upsetting as indicated at 90, is a disc 92 that is similar in structure and function to the previously described disc 54, with the exception that radial slits (56) and central openings (58) are not provided. Shaft 82 is journalled in frame members 94 and 96, and a snap ring 98 is provided in back of member 96 to restrict axial motion of shaft 82. A pair of concave and concentrically nested discs 100 and 102 is clamped between washers 104 by upsetting of the end of shaft 82 as indicated at 106. Beyond the flatly engaging central areas of the discs 100 and 102, these discs are turned at an angle $\theta$, to such central areas. At the disc edges, however, indicated at 106 and 108, they are turned divergently away from each other to provide a flare for reception of the periphery of disc 92.

In the form of the invention previously described, proper contact between the driving and driven discs was established by virtue of the angular disposition ($\theta$) of the periphery of the disc 54 in approximate correspondence to the angular relationship (angle $\phi$, FIGURE 2) of the shafts. By contrast to this arrangement, in FIGURE 4 such contacts can be established by virtue of the angles $\theta_2$ and $\theta_1$ in FIGURE 4, at which angles, respectively, the periphery of disc 92 and the peripheries of discs 100 and 102 are disposed with respect to their central planes. The sum of angles $\theta_1$ and $\theta_2$ will be found to approximate the angle between the shafts, FIGURE 4, though as previously explained exactness in this respect is not necessary due to the inherent flexibility of the discs. Whereas in drive means according to FIGURES 1 to 3 certain contacts between the discs may be at large areas between points $P_1$ and $P_2$, in the present form the nature of contact between disc 92 and discs 100 and 102 will tend to be over truer circular or annular lines, especially if these discs are of approximately the same diameter. In other words, the points $P_1$ become more condensed toward $P_2$, the $P_1$ spread having disappeared because of compatible curvatures. The reason for this apparently involves the fact that, rather than the disc or discs on one of the shafts being flat, the discs on both shafts curve compatibly in the same sense. In practice the drive means illustrated in FIGURE 4 has been found to be highly satisfactory in transmitting torque between shafts disposed at a large angle and to be highly favorable in wear resistance. Additionally, the severe stress of the disc 92 is eliminated by truer annular line contact.

Figure 4:
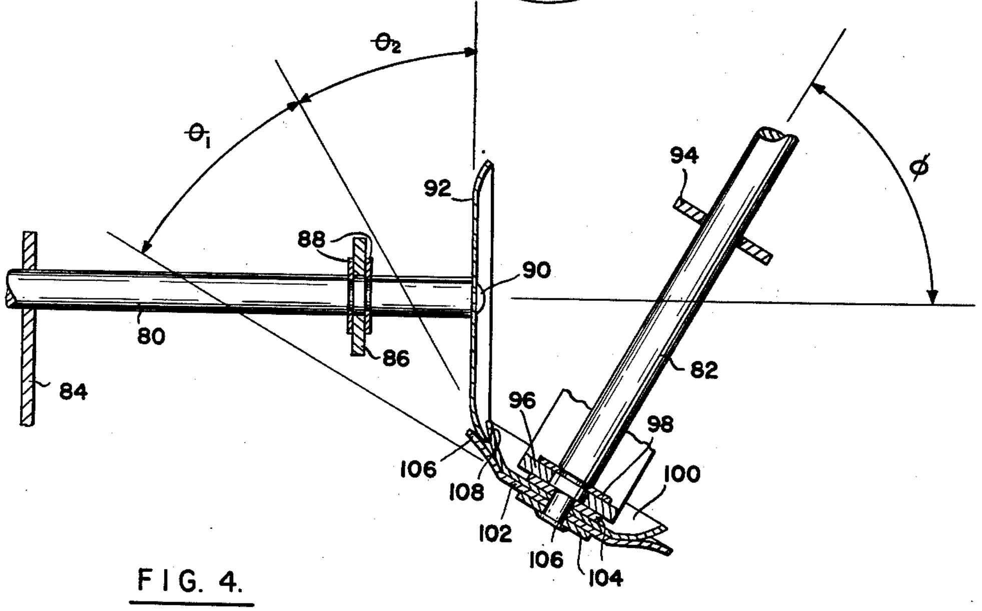
FIGURE 4 illustrates a modified form of pinched disc drive means according to the invention, wherein the discs on both the driving and driven shafts have their circular peripheral portions turned at an angle to the central planes of the respective discs.

It will be understood that in the drive means according to FIGURE 4, as well as in the other forms of the invention described herein, either of the shafts 80 or 82 may be the driving shaft and the other the driven shaft. Also, again it may be noted that in this form of the invention deviations of one or both of the shafts from their normal relationship is tolerated. For example, the left end of shaft 80, as viewed in FIGURE 4, might be moved normal to the plane of the drawing without destroying the ability of the pinched disc drive means to function properly.

Figure 5:
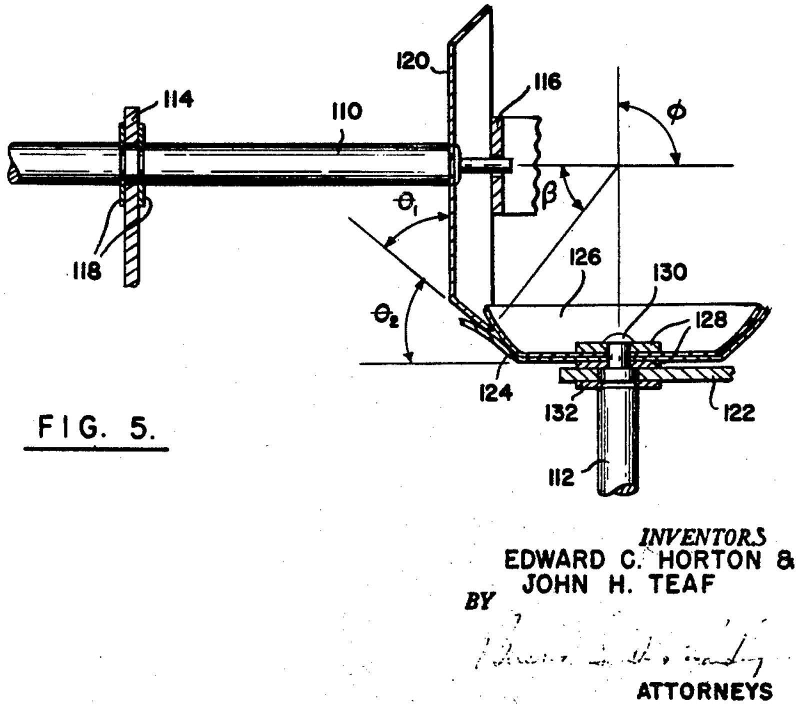
FIGURE 5 illustrates a further modified form of the invention, similar to that of FIGURE 4, wherein the shafts are disposed at right angles.

A variation of the drive means shown in FIGURE 4 will be described with reference to FIGURE 5. In FIGURE 5 there are shown two shafts 110 and 112 having axes intersecting at an angle of approximately 90°, or in other words at an angle greater and more severe than the angle in FIGURE 4. Shaft 110 is journalled in frame members 114 and 116, snap rings 118 being provided to restrict its axial movement, and has secured thereto a concave disc 120. Shaft 112 is journalled in a frame member 122 and has secured thereto in concentrically nested relationship a pair of discs 124 and 126. The latter discs are clamped between washers 128, which are secured by upsetting as indicated at 130. Snap ring 132 limits axial movement of shaft 112.

The periphery of disc 120 deviates from its central plane by the angle $\theta_1$ and the peripheries of discs 124 and 126 similarly are turned upwardly at the angle $\theta_2$, these angles being in FIGURE 5. Again, as in the case of FIGURE 4, the sum of angles $\theta_1$ and $\theta_2$, FIGURE 5, approximates the angle $\phi$ between the shafts.

The driving ratio of the means shown in FIGURE 5 is approximately unity, by reason of the fact that the discs have approximately the same diameter. With respect to such ratios, a convenient observation may be drawn from FIGURE 5 in that the ratio (in revolutions) of shaft 110 to shaft 112 equals the tangent of angle $\beta$. The driving ratio is similarly determined mathematically for all of the other forms of the invention disclosed herein.

A variation of pinched disc drive means for transmitting motion between shafts disposed at an angle of 90° will be described with reference to FIGURES 6 and 7. The shafts 140 and 142 are relatively disposed at an angle of 90°, and motion is transmitted therebetween by a pair of discs 144 and 146 and a wheel 148. Discs 144 and 146 correspond functionally and structurally to the previously described discs 60 and 62 (FIGURE 2) and are clamped between washers 149 on the end of shaft 140 in the manner previously described. Shaft 140 is journalled in frame members 150 and 152, and snap ring 154 is provided to restrict axial movement. The wheel 148, however, differs considerably from any of the discs previously described. Wheel 148 comprises a flat disc having the circular periphery turned at 90° to its central plane, slits 156 being cut in this periphery to render it highly flexible as in the case previously mentioned. Wheel 148 is secured to the end of shaft 152 by upsetting 158 and is journalled in frame members 160 and 162, snap rings 164 restricting axial movement. The right-angular periphery of wheel 148 is tightly gripped in the nip provided between discs 144 and 146 and driving engagement is thereby established. The ratio between shafts 140 and 142 is considerable, i.e., it is far from unity, and therefore the diameter of wheel 148 is large as compared to the diameter of discs 144 and 146. To insure proper engagement between these driving elements, therefore, a roller 166, mounted on a frame member 168 by a pin 170, bears upon the radially outer portion of wheel 148 as shown.

In describing the form of the invention according to FIGURES 1 and 2, for example, it was mentioned that the shafts (34 and 36) rotate in opposite directions. In certain situations, however, it is desired to transmit motion between shafts, having their axes intersecting at a relatively small angle, so that a reversal of rotation does not occur, i.e., it is desired that the driving and driven shafts rotate in the same direction. Referring next to FIGURE 8, this problem is solved by the form of the invention there illustrated. Shaft 170, journalled in frame members 172 and 174, has secured thereto a flat circular disc 176. A ring 178 is mounted on the plate 176 by studs 180, and the inner edge 182 of this ring is turned out of the plane normal to shaft 170 as illustrated. A shaft 184, journalled in frame members 186 and 188, has secured to the end thereof pinch discs 190 and 192 which correspond functionally and structurally to the previously described discs 60 and 62 (FIGURE 2). The inner edge 182 of ring 178 projects into the nip of discs 190 and 192, being frictionally grasped tightly therein, whereby motion is effectively transmitted between shafts 170 and 184. Further principles need not be elaborated, as they are identical with those applicable to the forms of the invention previously described herein.

In further situations it may be desired to transmit motion between shafts which are laterally spaced by a considerable distance and have intersecting axes. In such a case if pinched disc drive means are to be employed, there will be involved larger than normal discs. Due to limited space and other design considerations, however, this may not be permissible. Turning them to FIGURE 9, the shafts 200 and 202 have axes intersecting at the angle $\phi$, and their ends are separated by a relatively large distance as compared to forms of the invention previously described. On shaft 200 discs 204 and 206, corresponding functionally and structurally to the discs 60 and 62, are secured in previously described fashion. On shaft 202 similar pinched discs 208 and 210 are mounted. On a frame member 212 there is freely mounted for rotation a pivot 214, bearing a disc 216 which may be said to correspond to previously described disc 54, except that disc 216 is engaged by both the pair of discs 204 and 206 and the pair of discs 208 and 210. Thereby the disc 216 acts as an idler, transmitting motion between the pair of discs 204 and 206 and the pair of discs 208 and 210. It will be noted that the periphery of disc 210 is turned at an angle to the central plane thereof in order to effect the transmission of motion between the angularly disposed shafts 200 and 212.

It will be understood that various departures from the specifically disclosed form of the invention may be effected without departing from the scope thereof as defined by the following claims.

What is claimed is:

1. Torque transmitting means for rotating a driven shaft in the same direction as a driving shaft positioned at an angle with respect thereto comprising:
   an annular, frusto-conical member rigidly secured to one of said shafts to rotate therewith,
   a pair of friction discs rigidly secured to the other of said shafts to rotate therewith,
   said discs and said member being positioned relative to each other such that said discs frictionally engage the radially inner edge of said annular member and transmit rotation in the same direction between said shafts.

2. The drive means as claimed in claim 1 wherein, the slope of said frusto-conical member is substantially equal to the angle between said shafts.

3. Torque transmitting means for rotating a driven shaft in the same direction as a driving shaft positioned at an angle with respect thereto comprising:
   a pair of friction members mounted on each of said shafts to rotae with each of said shafts respectively,
   a conical idler disc mounted for rotation between said shafts,
   said disc and said pairs of members being positioned such that the periphery of said disc is frictionally engaged between the members of both of said pairs so as to transmit rotation from said driving shaft through said idler disc to said driven shaft.

4. The drive means as claimed in claim 3 wherein the slope of said conical disc is substantially one-half of the angle formed by said shafts.

5. The drive means as claimed in claim 3 wherein said conical disc is sufficiently flexible to compensate for slight variations in the magnitude of the angle formed by said shafts.

6. Drive means for transmitting rotation from a driving shaft to a driven shaft positioned at an angle with respect thereto comprising:
   a disc secured to one of said shafts to rotate therewith,
   said disc having a peripheral portion disposed at an angle with respect to said one shaft,
   a pair of friction members secured to the other of said shafts to rotate therewith,
   each of said members having a peripheral portion disposed at an angle with respect to said other shaft,
   said members and said disc being positioned such that the former frictionally engage opposite peripheral surfaces of the latter so as to transmit rotation from said driving shaft to said driven shaft.

7. Drive means for transmitting rotation from a driving shaft to a driven shaft positioned at an angle with respect thereto comprising:
   a disc secured to one of said shafts to rotate therewith,
   said disc having a peripheral portion disposed at an angle with respect to said one shaft,
   said peripheral portion having radial slits therein defining a plurality of individually resilient peripheral sectors,
   a pair of friction members secured to said other shaft to rotate therewith,
   said disc and said members being positioned such that the latter frictionally engage said peripheral sectors to thereby form a flexible friction coupling between said driving and driven shafts.

References Cited in the file of this patent

UNITED STATES PATENTS 1,688,313 Pacent ---------------- Oct. 16, 1928

FOREIGN PATENTS 558,725 Germany ------------- Sept. 10, 1932
819,642 France ---------------- July 12, 1937